United States Patent
Murali et al.

(10) Patent No.: US 9,680,677 B2
(45) Date of Patent: Jun. 13, 2017

(54) WEATHER BAND RECEIVER

(71) Applicant: Texas Instruments Incorporated, Dallas, TX (US)

(72) Inventors: Sriram Murali, Bangalore (IN); Indu Prathapan, Bangalore (IN); Pankaj Gupta, Dausa (IN); Zahir Ibrahim Parkar, Bangalore (IN); Sundarrajan Rangachari, Trichy (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/528,660

(22) Filed: Oct. 30, 2014

(65) Prior Publication Data

US 2016/0127161 A1    May 5, 2016

(51) Int. Cl.
*H04L 27/14*    (2006.01)
*H04L 27/156*    (2006.01)
*H04L 27/34*    (2006.01)
*H04W 52/02*    (2009.01)

(52) U.S. Cl.
CPC ...... *H04L 27/1566* (2013.01); *H04L 27/3455* (2013.01); *H04W 52/0229* (2013.01)

(58) Field of Classification Search
CPC G01W 1/08; G08B 1/08; G08B 21/08; G08B 29/00; G08G 1/123; G08G 5/00; H04B 1/10; H04B 1/16; H04B 1/18; H04B 3/00; H04B 15/00; H04H 1/00; H04H 20/48; H04H 60/58; H04L 27/00; H04L 27/06; H04L 27/14; H04L 27/1566; H04L 27/16; H04L 27/3455; H04L 27/389; H04M 11/04; H04Q 7/20
USPC .......... 340/506, 539.1, 539.16, 539.28; 375/150, 152, 259, 272, 303, 320, 324, 375/334, 340, 341, 344; 455/3.04, 62, 455/180.1, 142, 296, 404.1
See application file for complete search history.

(56) References Cited

U.S. PATENT DOCUMENTS

| | | | |
|---|---|---|---|
| 2005/0286660 A1* | 12/2005 | Nysen ................. | H04L 27/1525 375/343 |
| 2008/0227418 A1* | 9/2008 | Altizer et al. ............. | 455/180.1 |
| 2009/0028250 A1* | 1/2009 | Taipale et al. ................ | 375/259 |
| 2009/0154606 A1* | 6/2009 | Li ................................. | 375/341 |
| 2010/0144306 A1* | 6/2010 | Karr ....................... | G08B 27/00 455/404.1 |
| 2010/0259378 A1* | 10/2010 | Moore ..................... | 340/539.28 |
| 2011/0051855 A1* | 3/2011 | Shibata ................... | H04L 27/14 375/340 |
| 2012/0002763 A1* | 1/2012 | Kawaguchi .................. | 375/343 |
| 2013/0076523 A1* | 3/2013 | Kwan ................. | A61B 5/0022 340/686.6 |

* cited by examiner

*Primary Examiner* — Shawkat M Ali
(74) *Attorney, Agent, or Firm* — Lawrence J. Bassuk; Charles A. Brill; Frank D. Cimino

(57) ABSTRACT

A weather band receiver, which may be part of an FM receiver, is disclosed. FSK-encoded data units in an alert packet transmission are detected using a quadrature matched filter circuit. At least one FSK-encoded data unit is captured from the alert packet transmission. Soft quantized bits are extracted from the FSK-encoded data units. The soft quantized bits are saved to memory and used to recover an alert message. Soft quantized bits from two or more FSK-encoded data units may be combined before recovering the alert message.

18 Claims, 5 Drawing Sheets

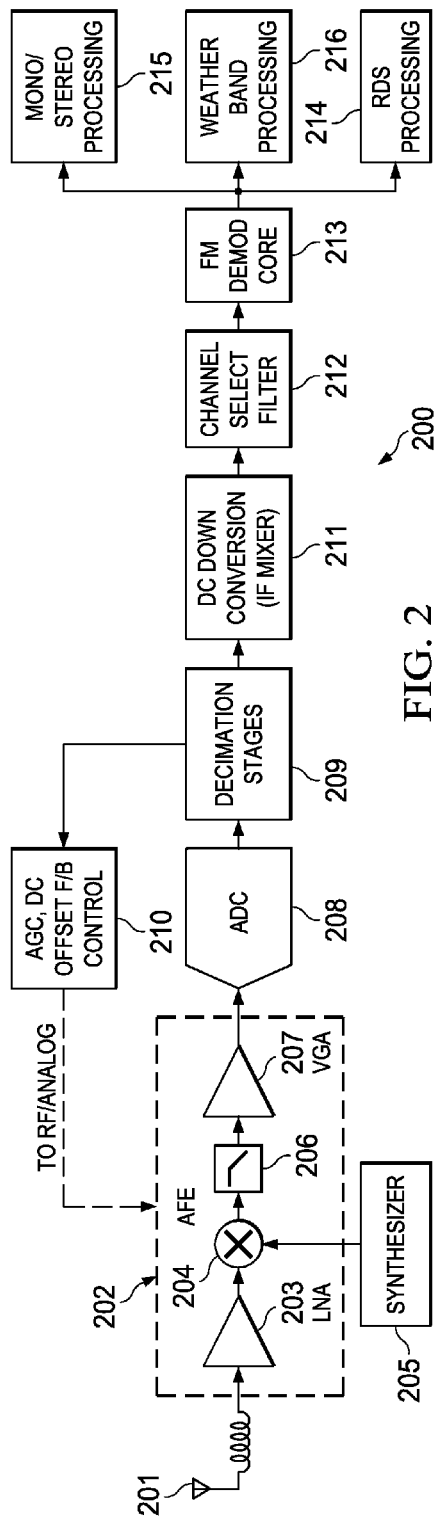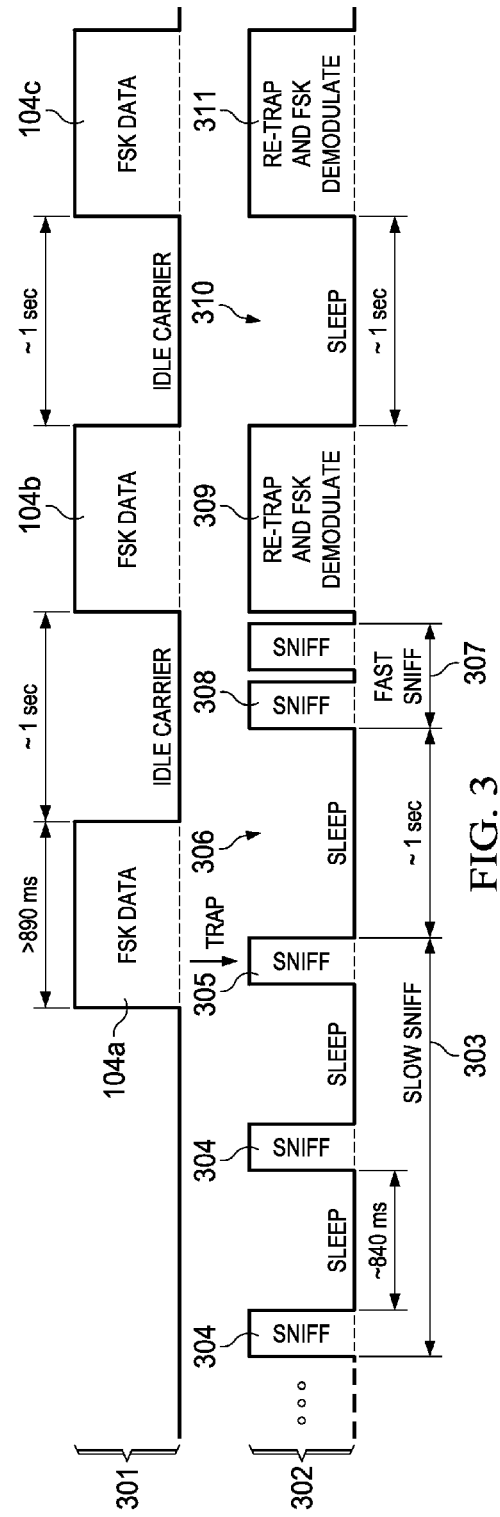

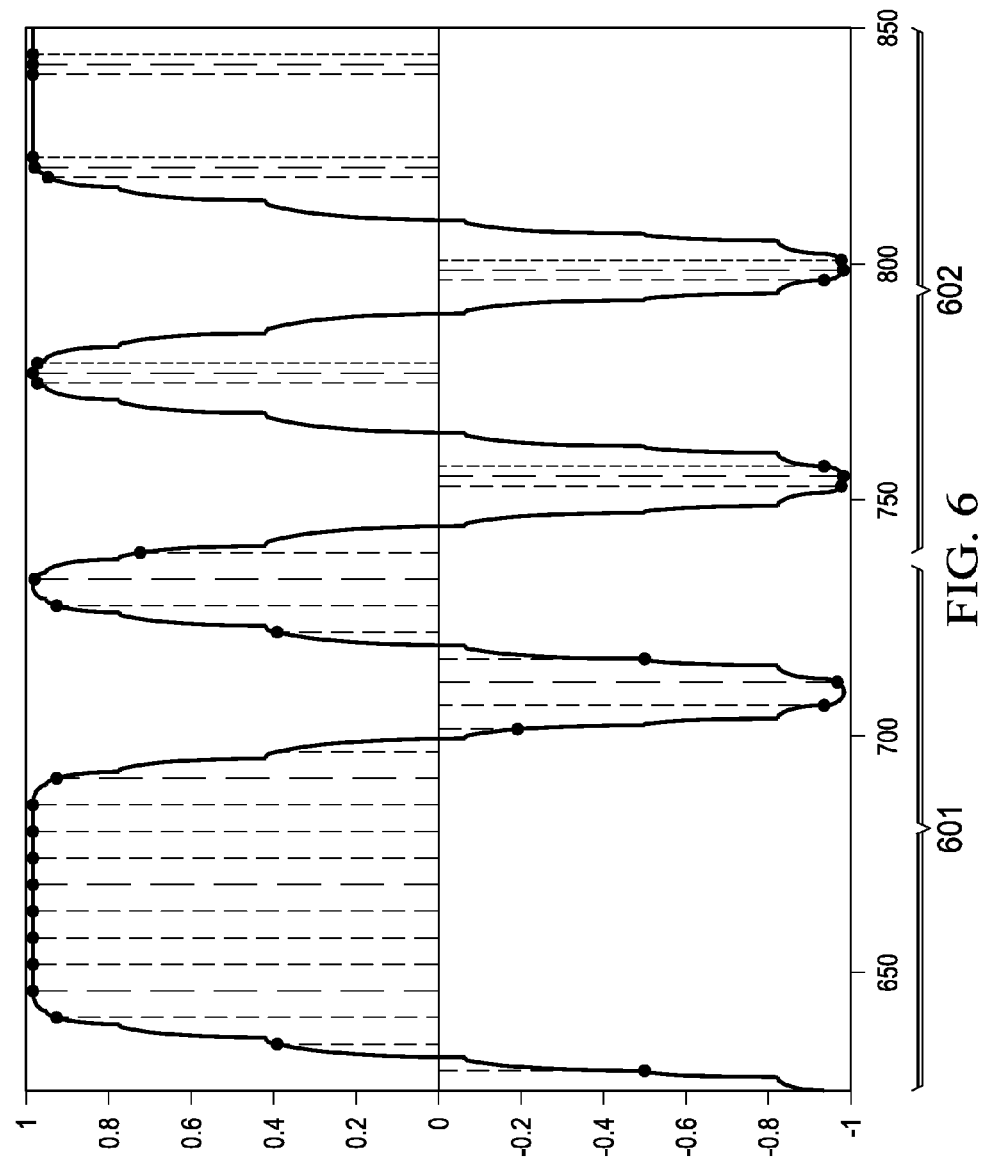

WEATHER BAND RECEIVER

BACKGROUND

In the United States and Canada, weather alerts and emergency information are broadcast over the Weather Band, consisting of seven channels from 162.4 to 162.55 MHz. Weather alerts employ Frequency Modulation (FM), and the messages consist of voice alerts that are time-multiplexed with Frequency-Shift Keying (FSK)-modulated digital data, carrying information about the nature and geographical relevance of the alerts. While both FM radio and Weather Band transmissions employ frequency modulation, the message structure for Weather Band alters is very different from FM radio and a standard FM receiver is not configured to receive and detect alerts in the Weather Band.

SUMMARY

Embodiments provide a Weather Band reception system. The Weather Band reception system requires very low area overhead and uses a low-power strategy for scanning the weather band for alerts.

A method for Weather Band reception comprises sampling a received signal, by a detection device, at first sampling intervals, sampling the received signal at second sampling intervals after detecting first FSK data, capturing second FSK data, and after the second FSK data has been captured, placing the detection device in a low-power state for a sleep period. The sleep period may have a duration that is shorter than an interval defined for FSK data units broadcast by a weather alert system.

Upon expiration of the sleep period, third FSK data is captured. The detection device may be placed in the low-power state for the sleep period after first FSK data is detected in the received signal. The received signal may be sampled at the second sampling intervals by the detection device at the end of the sleep duration. Data bits are extracted from the second FSK data and the third FSK data. The data bits are stored as soft quantized bits in a memory. The soft quantized bits may be combined to create an alert message.

An FSK demodulation device comprises first and second quadrature matched filter circuits each having an input configured to receive a base-band signal. The first quadrature matched filter circuit generates a first output waveform corresponding to 0 bits that are encoded in the base-band signal using FSK. The second quadrature matched filter circuit generates a second output waveform corresponding to 1 bits that are encoded in the base-band signal using FSK. A summation circuit is coupled to the output of the first and second quadrature matched filter circuits. The summation circuit is configured to sum the first output waveform and the second output waveform to create a sum waveform.

An FSK detection circuit receives the sum waveform and determines when FSK-encoded data is present in the base-band signal. A difference circuit is coupled to the output of the first and second quadrature matched filter circuits. The difference circuit creates a difference waveform by subtracting the first output waveform from the second output waveform. A timing recovery circuit receives the difference waveform and identifies peaks in the difference waveform that correspond to bits in the base-band signal. Performing Amplitude Shift Keying (ASK) demodulation by the timing recovery circuit to extract data bits from the base-band signal.

The FSK demodulation device may be part of a Frequency Modulation (FM) receiver circuit having an FM demodulator output, wherein the inputs for the first and second quadrature matched filter circuits are coupled to the FM demodulator output.

BRIEF DESCRIPTION OF THE DRAWINGS

Figure 1:
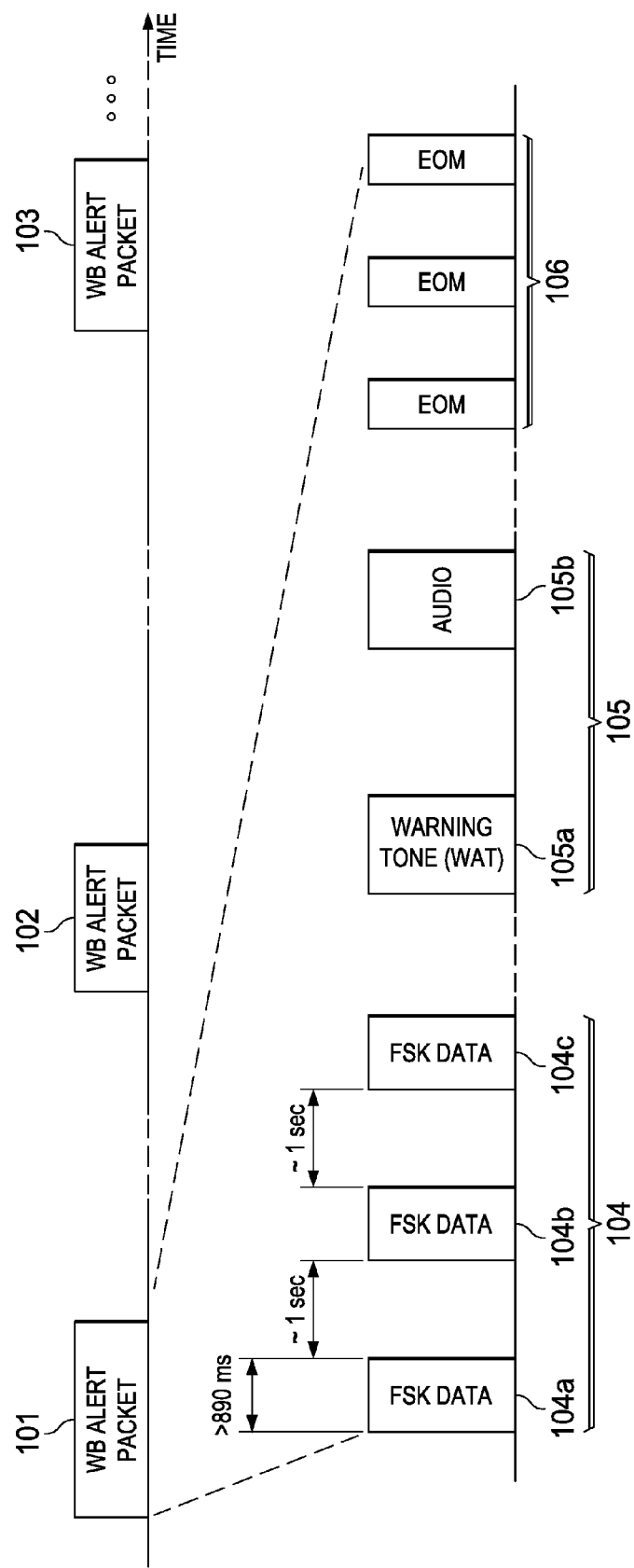

Having thus described the invention(s) in general terms, reference will now be made to the accompanying drawings, wherein:

FIG. 1 illustrates the characteristics of a Weather Band transmission.

FIG. 2 illustrates one embodiment having a weather band subsystem integrated into a regular FM radio receiver.

FIG. 3 illustrates the processing that occurs in Weather Band processing circuitry according to one embodiment.

Figure 4:
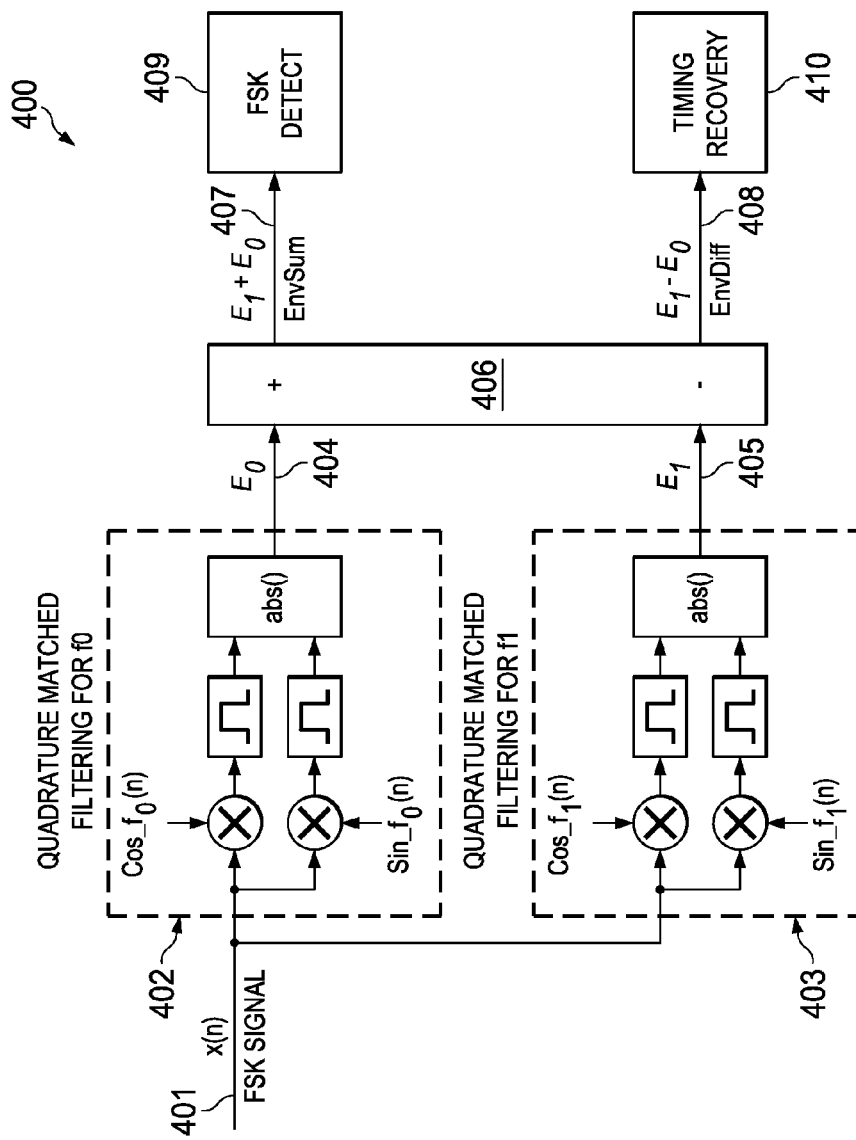

FIG. 4 is a block diagram of a detection circuit using quadrature matched filtering.

Figure 5:
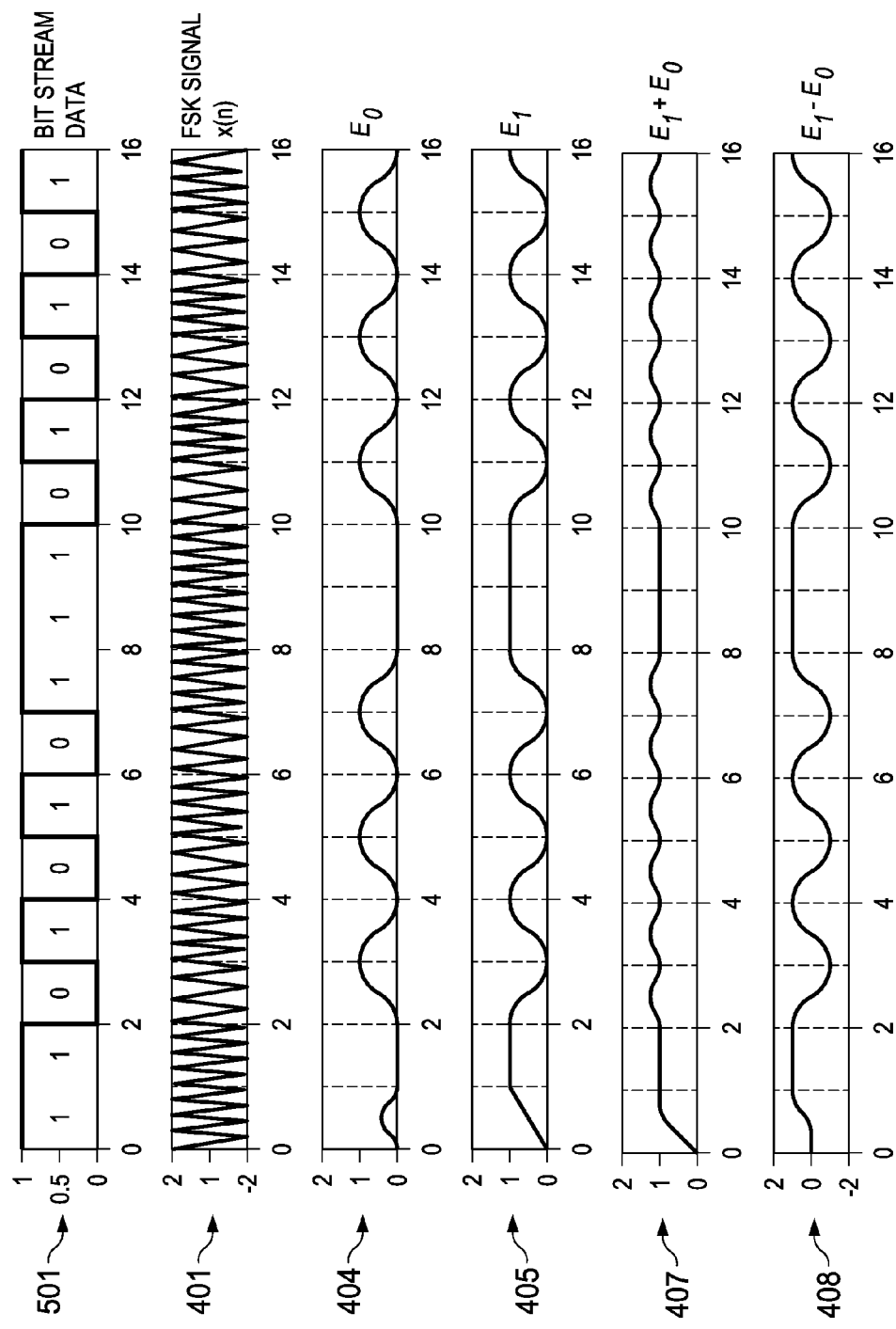

FIG. 5 illustrates data that has been FSK-encoded into a Weather Band Alert Packet and the corresponding signals in an FSK detection circuit.

FIG. 6 illustrates sampling of an envelope difference waveform to identify data bits.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

NOAA Weather Radio All Hazards (NWR) is a nationwide network of radio stations broadcasting continuous weather information from the nearest National Weather Service office. NWR broadcasts warnings and information for all types of hazards including natural events, environmental accidents, and public safety issues. Weather alerts and emergency information are aired on seven "Weather Band" channels in the range 162.4-162.55 MHz. The specific channels currently in use are: 162.400 MHz, 162.425 MHz, 162.450 MHz, 162.475 162.500 MHz, 162.525 MHz, and 162.550 MHz.

The Weather Band transmissions employ frequency modulation; however, the message structure and bandwidth are different from conventional broadcast FM radio. In NWR, the base-band message is a time-multiplex of digital and analog messages. The digital messages include FSK-modulated data that indicates the event type (e.g., tornado, flood, etc.) and a geographical location code in a Specific Area Message Encoding (SAME) code. The SAME code contains the type of message, county(s) affected, and message expiration time. The analog messages include a warning alarm tone (WAT) and/or a voice message carrying a vocal alert/warning.

FIG. 1 illustrates the characteristics of a Weather Band transmission. Most of the time—in the absence of alerts—the Weather Band carrier is idle and unmodulated. When an alert occurs, an alert packet 101 is transmitted. Subsequent alert packets 102, 103, which may be associated with the same event as packet 101 or a different event, are transmitted after an arbitrary time. Each alert packet 101-103 comprises a time-multiplex of digital components 104, analog components 105, and end of message (EOM) components 106. Digital components 104a-c are always present in the alert packet and comprise three identical copies of FSK data. The digital components 104a-c are binary FSK modulated. The digital components 104a-c have a minimum duration of 890 ms and are separated by approximately one second. The analog components 105 are optional and may include a Warning Alarm Tone (WAT) 105a and/or an analog audio alert message 105b.

FIG. 2 is a block diagram of receiver architecture 200 for processing FM Radio and Weather Band signals. The core hardware generates an FM de-modulated digital base-band signal, which can be processed to extract information for broadcast FM audio signals and NWR alerts. Signals are received by antenna 201 and provided to analog front end (AFE) 202. The received signals are amplified in low-noise amplifier (LNA) 203, and then down-converted in mixer 204 using a local oscillator signal from synthesizer 205. The output of mixer 204 is then filtered in low-pass filter 206 and amplified in variable gain amplifier (VGA) 207. The output of AFE 202 is provided to analog-to-digital converter (ADC) 208 to create a digital signal that is processed by decimation stages 209. Feedback is provided to AFE 202 via feedback control circuit 210.

The output of decimation processing 209 is down-converted in IF mixer 211 and filtered in channel select filter 212. The filtered signal is then demodulated in FM demodulation circuitry 213 to provide a digital base-band signal that can be further processed to extract information. Radio Data System (RDS) circuitry 214 processes the digital base-band signal to extract digital information, such as time, station identification and program information, from conventional FM radio broadcasts. Mono/stereo processing 215 extracts audio information, such as speech and music, from the digital base-band signal. Weather Band (WB) processing circuitry 216 also receives the digital base-band signal and identifies and processes the FSK modulated NWR signals.

FIG. 3 illustrates the processing that occurs in WB processing circuitry 216 according to one embodiment. Signals 301 represent FSK data 104a-c that is carried in a Weather Band alert packet 101 (FIG. 1) received at receiver 200 (FIG. 2). The FSK data 301 is provided as a digital base-band signal to WB processing circuitry 216. Operations 302 illustrate the operations performed by WB circuitry 216. While waiting for Weather Band data to arrive, circuitry 216 operates in a slow sniff phase 303 during which it continuously attempts to detect FSK data at regular intervals 304. In between the sniff intervals 304, receiver 200 may sleep to conserve power and processor cycles. The length of the sleep periods may be selected based upon a minimum FSK data size and a duration of the sniff interval. For example, in one embodiment, if the sleep periods are approximately 840 ms long, then one of the sniff intervals 305 will eventually occur during FSK data component 104a, which is at least 890 ms long. This allows circuitry 216 to trap at least part of the data in the first FSK data component 104a.

Since it is known that the FSK data components 301 are separated by one second, receiver 200 enters sleep mode 306 for one second after trapping FSK data 104a at sniff interval 305. This ensures that WB circuitry 216 will wake up the receiver 200 at or before the arrival of next FSK data component 104b. When WB circuitry 216 wakes up the receiver 200 after sleep period 306, it begins a fast sniff phase 307 to detect the next FSK data component. At operation 309, when FSK data component 104b is detected, the WB circuitry traps and FSK-demodulates the data carried by FSK data component 104b.

When the second FSK data component 104b ends, WB circuitry may put the receiver 200 in another one-second sleep period 310—the known interval between FSK components—while waiting for the third FSK data component 104c. WB circuitry 216 then wakes up receiver 200 to trap and FSK-demodulate 311 the data carried in third FSK data component 104c.

Using this process, the WB processing circuitry should obtain at least a part of the first FSK data component 104a, all of second FSK data component 104b, and all of third FSK data component 104c.

FIG. 4 is a block diagram of an FSK detection circuit 400 using quadrature matched filtering. Because the Weather Band carrier is always present, the receiver cannot simply use a carrier-detection scheme to determine when to wake-up. Instead, the presence of actual Weather Band Alert Packet data needs to be detected. The FSK detection circuit 400 provides such data detection along with decoding the actual data into the bit stream content.

An FSK input signal 401 is received from an FM receiver, such as the base-band output of FM demodulator 213 (FIG. 2). Input signal 401 is received by two quadrature matched filter circuits 402, 403. Circuit 402 filters for $f_0$, and circuit 403 filters for $f_1$, where $f_0$, $f_1$ are defined in a NWR protocol for FSK encoding. The output 404 of quadrature matched filter circuit 402 is an envelope $E_0$ correlated to encoded 0 bits in the FSK input 401. Envelope $E_0$ is peaks when $f_0$ or a 0 bit is detected. The output 405 of quadrature matched filter circuit 403 is an envelope $E_1$ correlated to encoded 1 bits in the FSK input 401. Envelope $E_1$ is peaks when $f_1$ or a 1 bit is detected. The envelope $E_0$ and/or envelope $E_1$ outputs may lag behind the actual bit stream data timing due to processing delays. The $E_0$ and $E_1$ outputs can be adjusted and aligned by the Weather Band processing circuitry.

Comparison circuit 406 generates an Envelope Sum 407 and/or an Envelope Difference 408 using the outputs from the quadrature matched filtering. Envelope Sum $(E_1+E_0)$ 407 corresponds to the presence of any FSK data and may be used in FSK detection circuitry 409 for fast detection of FSK encoding. FSK detection circuit 409 may use this information, for example, to control the subsequent sleep/wake-up intervals of the receiver 200.

Envelope Difference $(E_1-E_0)$ 408 corresponds to the bit stream data carried by the Weather Band Alert Packet. Envelope Difference $(E_1-E_0)$ 408 may be provided to a timing recovery circuit 410 that is used to determine the timing of data bits carried in the input signal. Timing recovery circuit 410 may also perform Amplitude Shift Keying (ASK) demodulation on the Envelope Difference $(E_1-E_0)$ waveform 408 to extract data bits as described below.

FIG. 5 illustrates data 501 that has been FSK-encoded into a Weather Band Alert Packet and the corresponding signals in FSK detection circuit 400. Input signal 401 is received from an FM receiver, such as the base-band output of FM demodulator. Envelope $E_0$ 404 is output by $f_0$ quadrature matched filter circuit 402, and envelope $E_1$ 405 is output by $f_1$ quadrature matched filter circuit 403.

Envelope Difference $(E_1-E_0)$ 408 corresponds to the 0 and 1 bits in the data 501 carried by the FSK encoding. The Envelope Difference signal 408 rises to, or remains at, a high voltage when a 1 bit is detected, and falls to, or remains at, a low voltage when a 0 bit is detected.

Envelope Sum $(E_1+E_0)$ 407 indicates that some FSK-encoded data 501 has been detected. The Envelope Sum signal 407 rises to a high voltage and remains there when either a 0 bit or a 1 bit is detected.

In traditional demodulation of non-coherently orthogonal FSK, timing recovery is performed before or alongside envelope detection using FSK-specific methods, such as locating consistent zero crossings across symbols, etc. In existing systems, envelopes $E_0$ and $E_1$ are sampled and compared to identify that corresponding data bits: (i.e., if $E_0 > E_1$, then data bit=0; if $E_1 > E_0$, then data bit=1). In the present invention, Envelope Difference ($E_1 - E_0$) 408 represents an ASK waveform corresponding to the input FSK waveform 401. Accordingly, ASK demodulation can be applied to the Envelope Difference ($E_1 - E_0$) waveform 408 to extract the data bit stream. The Envelope Difference ($E_1 - E_0$) waveform 408 may be used for both timing recovery and demodulation, using any methods applicable to ASK. This allows symbol timing recovery to be postponed to a later stage in demodulation (i.e., after FSK detection), which allows the receiver to maximize sleep time.

It will be understood that, in other embodiments, just one of the envelopes $E_0$ or $E_1$ need to be used for data demodulation. The high values in the $E_1$ output of quadrature matched filter 403 correspond to the 1 data bits in the FSK input 401. The low values in the $E_1$ output of quadrature matched filter 403 also correspond to the 0 data bits in the FSK input 401. Similarly, the high values in the $E_0$ output of quadrature matched filter 402 correspond to the 0 data bits in the FSK input 401, and the low values correspond to the 1 data bits in the FSK input 401. Accordingly, either the $E_1$ output or the ($-E_0$) output alone may be used for data demodulation and data bit detection in some embodiments. The detected data bits may be soft quantized and stored to memory for further processing. Soft quantized bits from two or more FSK data components 104 may be combined or averaged.

FIG. 6 illustrates sampling of an Envelope Difference ($E_1 - E_0$) waveform to determine data bits and to do timing recovery. During an initial period 601 the sampling is performed at regular intervals to extract timing information and to identify peaks. Once the timing of peaks is determined, then during a second period 602, sampling is performed at the peaks. Early-late timing can be used at the peaks for further refinement.

Referring again to FIG. 3, the occurrence of three repeated copies of the FSK data unit 104a-c can be exploited for soft-decision decoding with memory-efficient, in-place soft-combining. This helps to achieve better demodulation sensitivity during FSK reception and is integrated with the low power alert trapping mechanism.

The FSK data stream recovered from each unit (104a-c) after timing recovery is represented as a sequence values between +1 and −1. For example, each sample may be one of sixteen uniformly spaced real values between +1 and −1. These values may be saved to memory as "soft quantized data bits." As soft-quantized data bits are received from the other copies of the FSK data 104, they are in-place combined or averaged in the memory with corresponding soft quantized data bits from the prior FSK data copies of message 104. When the last copy of FSK data (104c) has been received, the in-place combined soft copies are then hard-quantized to 1 and −1, as appropriate, to declare the FSK data bits. (In other embodiments, the hard-quantized values may be set at other values, such as 1 and 0.) This process of soft-combining results in improved demodulation sensitivity.

All three FSK data copies (104a-c) might not be detected for each alert. For example, in some circumstances, such as when the receiver turns on during or after the first or second FSK data copy arrives, the Weather Alert reception device may only capture one full FSK data copy. It will be understood that the Weather Alert reception device disclosed here will still be able to recover alert data if only the last (104c) or last two (104b,c) FSK data copies are captured.

Embodiments of the invention provide a low-power Weather Alert reception device that exploits the Weather Band transmission format for lossless capture of weather alerts. Part of the alert information may be recovered from all three copies of the FSK data units in an Alert Packet. For example, bits may be captured from each FSK data unit and all three sets of captured bits combined into a received alert.

Alternately, the bits may be recovered from only the second and third copies of the FSK data in the Alert Packet, such as when the first FSK data unit is used to establish timing for trapping the second and third FSK data units. In a further embodiment, the bits may be recovered from only from the third copies of the FSK data in the Alert Packet.

In another alternate embodiment, the device may always sniff in a fast mode so that the bits are always recoverable from all three transmitted copies of the FSK data units.

An alert trapping mechanism uses an Envelope Sum obtained from matched filtering units to detect FSK reception. In one embodiment, this FSK packet detect is used to trigger timing recovery and demodulation using an Envelope Difference with ASK demodulation techniques.

It will be understood that in various embodiments, the components shown in FIGS. 2 and 4 may represent sets of software routines, logic functions, and/or data structures that are configured to perform specified operations. Although these components are shown as distinct logical blocks, in other embodiments at least some of the operations performed by these modules may be combined in to fewer blocks. Conversely, any given one of the components shown in FIGS. 2 and 4 may be implemented such that its operations are divided among two or more logical blocks. Moreover, although shown with a particular configuration, in other embodiments these various components may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
sampling a received signal, by a detection device, at first sampling intervals;
sampling the received signal at second sampling intervals after detecting or capturing first Frequency Shift Keying (FSK) data;
capturing second FSK data; and
after the second FSK data has been captured, placing the detection device in a low-power state for a sleep period.

2. The method of claim 1, further comprising:
upon expiration of the sleep period, capturing third FSK data.

3. The method of claim 2, further comprising:
extracting data bits from one, two or three FSK data units;
storing the data bits as soft quantized bits in a memory; and
combining the soft quantized bits to create an alert message.

4. The method of claim 1, further comprising;
placing the detection device in the low-power state for the sleep period after the first FSK data is detected or captured in the received signal; and
sampling the received signal at the second sampling intervals by the detection device at the end of the sleep period.

5. The method of claim 4, wherein the sleep period has a duration that is shorter than an interval defined for FSK data units broadcast by a weather alert system.

6. The method of claim 1, further comprising:
capturing at least part of the first FSK data;
extracting data bits from the first, and second FSK data;
storing the data bits as soft quantized bits in a memory;
combining the soft quantized; and
combining the data bits to create an alert message.

7. The method of claim 1, further comprising:
providing the received signal to a first quadrature matched filter circuit that outputs a first waveform corresponding to 0 bits in the FSK data;
providing the received signal to a second quadrature matched filter circuit that outputs a second waveform corresponding to 1 bits in FSK data; and
summing the first and second waveforms to create an FSK detection signal.

8. The method of claim 1, further comprising:
providing the received signal to a first quadrature matched filter circuit that outputs a first waveform corresponding to 0 bits in the second FSK data; and
processing the first waveform using Amplitude Shift Keying demodulation to extract data bits from the second FSK data.

9. The method of claim 1, further comprising:
providing the received signal to a second quadrature matched filter circuit that outputs a second waveform corresponding to 1 bits in the second FSK data; and
processing the second waveform using Amplitude Shift Keying demodulation to extract data bits from the second FSK data.

10. The method of claim 1, further comprising:
providing the received signal to a first quadrature matched filter circuit that outputs a first waveform corresponding to 0 bits in the second FSK data;
providing the received signal to a second quadrature matched filter circuit that outputs a second waveform corresponding to 1 bits in the second FSK data;
creating a difference signal corresponding to a difference between the first and second waveforms; and
processing the difference signal using Amplitude Shift Keying demodulation to extract data bits from the second FSK data.

11. The method of claim 1, further comprising:
sampling the received signal at a rate that captures three FSK data units broadcast in a weather band alert packet.

12. A Frequency Shift Keying (FSK) demodulation device, comprising:
a first quadrature matched filter circuit having an input to receive a FSK encoded base-band signal and an output providing an envelope $E_0$ correlated to encoded 0 bits in the FSK input, the envelope $E_0$ having a peak when a 0 bit is detected;
a second quadrature matched filter circuit having an input to receive the FSK encoded base-band signal and an output providing an envelope $E_1$ correlated to encoded 1 bits in the FSK input, the envelope E1 having a peak when a 1 bit is detected;
a summation circuit coupled to the outputs of the first and second quadrature matched filter circuits, the summation circuit having a first output providing a sum of the envelopes $E_0$ and $E_1$ to create a sum waveform, and a second output providing a difference of the envelopes $E_0$ and $E_1$ to create a difference waveform;
FSK detection circuitry having an input connected to the first output of the summation circuit for fast detection of FSK encoding; and
timing recovery circuitry having an input connected to the second output of the summation circuit to determine timing of data bits carried in the FSK encoded base-band signal.

13. A method comprising:
detecting, using a quadrature matched filter circuit, a first Frequency Shift Keying (FSK)-encoded data unit in an alert packet transmission;
capturing at least part of a second FSK-encoded data unit in the alert packet transmission;
capturing at least part of a third FSK-encoded data unit in the alert packet transmission;
extracting soft quantized bits from the second and third FSK-encoded data units;
saving the soft quantized bits to a memory; and
combining the soft quantized bits from the second and third FSK-encoded data units to recover an alert message.

14. The method of claim 13, further comprising:
capturing at least part of the first FSK-encoded data unit;
extracting soft quantized bits from the first FSK-encoded data unit;
saving the soft quantized bits from the first FSK-encoded data unit data to the memory; and
combining the soft quantized bits from the first, second, and third FSK-encoded data units to recover the alert message.

15. The method of claim 13, further comprising:
providing the captured parts of the second FSK-encoded data units to a first quadrature matched filter circuit that outputs a first waveform corresponding to 0 bits in the second FSK-encoded data units;
providing the captured parts of the second FSK-encoded data units to a second quadrature matched filter circuit that outputs a second waveform corresponding to 1 bits in the second FSK-encoded data units;
summing the first and second waveforms to create an FSK detection signal.

16. The method of claim 15, further comprising:
using the FSK detection signal to determine when to initiate a low-power mode for a detection circuit.

17. The method of claim 15, further comprising:
using the FSK detection signal to determine when to begin searching for subsequent FSK-encoded data units.

18. The method of claim 13, further comprising:
providing the captured parts of the second FSK-encoded data units to a first quadrature matched filter circuit that outputs a first waveform corresponding to 0 bits in the second FSK-encoded data units;
providing the captured parts of the FSK-encoded data units to a second quadrature matched filter circuit that outputs a second waveform corresponding to 1 bits in the second FSK-encoded data units;
creating a difference signal corresponding to a difference between the first and second waveforms; and
processing the difference signal using Amplitude Shift Keying demodulation to extract the data bits from the second FSK-encoded data units.

\* \* \* \* \*